United States Patent [19]

Vernacchio

[11] Patent Number: 4,986,154
[45] Date of Patent: Jan. 22, 1991

[54] TOOL FOR CUTTING IN TUBE ENDS AND METHOD

[75] Inventor: Lorenzo Vernacchio, Philadelphia, Pa.

[73] Assignee: The Boeing Company, Seattle, Wash.

[21] Appl. No.: 415,157

[22] Filed: Sep. 29, 1989

[51] Int. Cl.⁵ .................... B23D 21/14; B26D 3/14
[52] U.S. Cl. ............................ 83/54; 83/191; 83/195; 83/454; 83/467.1; 83/693; 83/917
[58] Field of Search ............ 83/54, 178, 188, 191, 83/184, 195, 454, 692, 693, 917, 522.17, 522.18, 916, 467.1, 581

[56] References Cited

U.S. PATENT DOCUMENTS

| | | | |
|---|---|---|---|
| 2,323,546 | 7/1943 | Krueger | 83/195 X |
| 3,005,369 | 10/1961 | Koster | 83/191 X |
| 3,180,196 | 4/1965 | Coulon et al. | 83/693 X |
| 3,455,196 | 7/1969 | Kreider | 83/454 |
| 3,971,275 | 7/1976 | Mach | 83/54 X |
| 4,043,164 | 8/1977 | Brookman | 83/191 X |
| 4,194,422 | 3/1980 | Williams | 83/917 X |
| 4,459,886 | 7/1984 | Belzil | 83/178 |
| 4,913,021 | 4/1990 | Moran | 83/641 |

*Primary Examiner*—Hien H. Phan
*Assistant Examiner*—Eugenia A. Jones
*Attorney, Agent, or Firm*—Jones, Tullar & Cooper

[57] ABSTRACT

A method and tool for forming a contour cut in a tube end by applying a force from within the tube end which is applied against the interior surface of the tube end. The tube includes a punch which engages the interior surface of the tube end and has a cutting edge generally conforming to the shape of the contour cut. Preferably each tube end is provide with mirror image contour cuts.

5 Claims, 1 Drawing Sheet

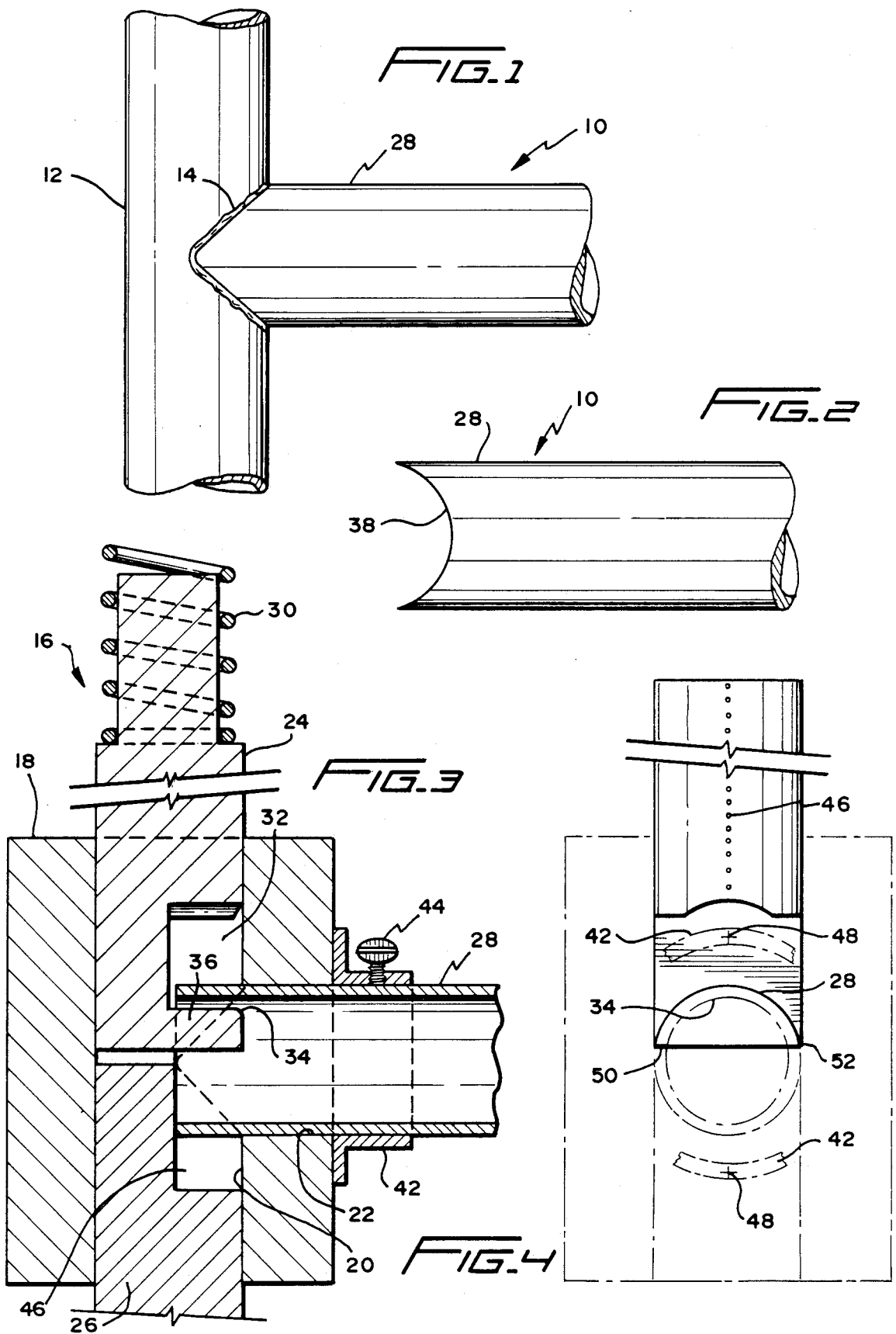

TOOL FOR CUTTING IN TUBE ENDS AND METHOD

BACKGROUND OF THE INVENTION

1. Technical Field

This invention deals with the cutting of tubes, and in particular to a tool in the form of a die set and a method for cutting tube ends.

FIG. 1 illustrates one application for tube cutting by the tool aspect of the present invention and in accordance with the method aspect of the present invention. In the illustration, the cut is a contour cut. The cut tube 10 is joined along the contour cut to a support tube 12 by welding 14. The arrangement shown in FIG. 1 could, for example, form part of a scaffolding assembly.

2. Prior Art

In many industries today, and in particular in the aircraft industry, throughout the production lines thereof, scaffolds, ladders etc. are needed for special applications. In the aircraft industry scaffolding, for example, is extensively used in airframe assembly. These structures, for the most part, are fabricated from cylindrical or square shaped tubes. The construction of these structures diverts from the time that could be spent on the production line, e.g. actually working on the airframe. Inevitably, these tubes must be cut and machined at their ends so that they can be fitted to each other, similar to the fitting shown in FIG. 1. The assignee of the present invention, for example, utilizes a procedure involving a milling machine to cut the contour end of the tube followed by sawing and/or filling of the cut contour end.

A need exists, therefore, for a more efficient and effective procedure and apparatus for producing the structures noted-above.

I'm aware of the following U.S. Pat. Nos. which relates to the cutting of tubes: 2,670,795; 3,120,143; 3,234,838; 3,455,196; 3,762,263; 3,921,482; 3,924,502; and 3,971,275. All of the tools disclosed operate on the tube to be cut from the external surface of the tube. This approach has not being satisfactory from a cost standpoint. In addition, none of these tools can readily produce a contour cut.

What is needed, therefore, is a simple procedure for cutting a tube, and in particular a tube with a contour cut in the tube end, so that it can be joined, for example, to a support tube such as support tube 12 shown in FIG. 1, without the need for any further machining. The procedure and tool should produce the necessary cut, and preferably a contoured cut without damaging or deforming the tube end.

SUMMARY OF THE INVENTION

The present invention addresses this problem, and provides the state-of-the-art with a new method and apparatus (tool) for cutting tube ends, and in particular for forming a contour cut in the tube ends without the need for subsequent machining. The tool includes a punch which engages the interior surface of the tube end and has a cutting edge generally conforming to the shape of the desired cut. The tube to be cut is inserted into a housing or blanking die within which the punch can reciprocate. The tube end to be cut receives the cutting edge within the tube end establishing thereby a cutting plane at which, through a shearing action, the cut occurs. A portion of the punch engages the interior surface of the tube at diametrically opposite points to ensure stability during the cutting action.

The tool cuts the tube cleanly such that the cut surface needs no further treatment or machining.

With the tool of the present invention, the shape or contour of the cut can easily be changed. All that is required to change the operation for a different cut or configuration is to alter the punch and the blanking die. The cut, regardless of shape, will originate from the interior of the tube. To avoid misunderstanding, the phrase contour cut will be used hereinafter to mean any configuration of cut.

The tool according to the present invention is simple to construct and does not require a great deal of parts. The amount of time needed to execute the cut is also very minimal. The tool can be operated either manually or it can be automated by using it with and automatic press. Because the tool is self-centering, the costs and effort involved are minimal.

As to the method aspect of the invention, there is contemplated the making of a cut in tube ends by originating the cut from the interior of the tube. It has been found that movement of part of the tool against the internal surface of the tube produces a clean cut requiring no further treatment or machining. In fact, the cut surface is easily fitted and prepared for welding in an application such as that shown in FIG. 1.

BRIEF DESCRIPTION OF THE DRAWINGS

Four figures have been selected to illustrate a preferred embodiment of the invention. While the figures are schematic in nature they are sufficiently detailed for those skilled in the art to practice the invention. Included are:

FIG. 1, which illustrates one application employing a tube cut in accordance with the present invention;

FIG. 2, which is a plan view of a tube end with a contour cut, for use in the application shown in FIG. 1;

FIG. 3 which is a cross sectional view of the tool showing the tube end mounted prior to a cutting operation; and FIG. 4, which is a front view of the punch part of the tool of the present invention.

DETAILED DESCRIPTION OF THE PREFERRED EMBODIMENTS

Both aspects of the present invention are predicated on the utilization of a cutting force applied to the tube end from within the interior of the tube end. It has been found that the resulting cut yields a relatively smooth surface that fits easily into assembly, such as the assembly of FIG. 1, and ready for welding. Further operations such as machining, filling, etc are not necessary.

The tool 16 shown in FIG. 3 operates as a die-set. Included is a housing or blanking die 18 which defines both a longitudinal bore 20 and a transverse bore 22 which intersects the longitudinal bore 20.

Mounted for reciprocal movement within the longitudinal bore 20 are a punch 24 and a drive piston 26, and a tube end 28 is mounted to be received within the transverse bore 20. The tube end 28 extends through the transverse bore 20, in a line-to-line fit, and into the longitudinal bore 20.

The punch 24 is biased downwardly (FIG. 3) into the longitudinal bore 20 by a spring 30 into engagement with the piston 26. For cavity, a clearance is shown between the punch 24 and piston 26 in FIG. 3. The punch 24 includes a slot 32 which receives the front of the tube end 28 so that a cutting edge 34 is situated within the interior of the tube end 28. A cutting plane 36 is established by the direction of the cutting edge 34 which yields the cut surface 38 (FIG. 2), which in this case is a contoured cut surface.

In the embodiment shown in FIG. 3, the piston 26 is also provided with a slot 40 of sufficient depth to ensure a proper clearance when the piston 26 strikes the punch 24 driving it upwardly against the bias of the spring 30.

A collar 42 is provided which has a set screw 44 for locking the collar to the tube end 28. The collar 42 may be provided with further locking means (not shown) for locking the collar 42 to the housing 18 thereby preventing relative rotation of the tube end 28 in the transverse bore 22.

The punch 24 includes a row of markings 46 which together with the markings 48 on the outer edge of the flange of the collar 42 serve an alignment function insuring that two mirror-image cuts can be made in the tube end 28.

To further ensure accuracy and stability, the cutting edge engages the interior surface of the tube end at two diametrically opposite points 50 and 52.

To cut a tube end such as the tube end 28 so that it has two contoured cut surfaces 38, the tube end 28 is inserted into the transverse bore 22 and the collar 42 tighten against the tube end 28 so that the markings 46 and upper marking 48 are in alignment. The piston 26 then strikes the punch 24 causing it to move upwardly against the bias of the spring 30 and at the same time causing the cutting edge 34 to engage the interior surface of the tube-end 28 at the plane 36. Continued movement of the piston 26 results in cutting of the tube end at the plane 36 by shear action since the outer surface of the tube end 28 receives a reactive force from the inside wall of the transverse bore 22. The contour cut surface 38 is thereby produced.

The piston 26 is retracted and the punch 24 also retracted under the influence of the spring 30. The tube end 28 is then withdrawn from the transverse bore 22, rotated 180° and reinserted into the transverse bore 22. The lower marking 48 on the flange of the collar 42 which is 180° removed from the upper marking is aligned with the markings 46. The procedure of striking the punch 24 with the piston 26 to engage the interior surface of the tube end 28 with the cutting edge 34 is repeated yielding a tube end with mirror-image cut surfaces similar to those of the tube end 28 shown in FIG. 1.

By cutting the tube end from the inside-out, the cut surface is surprisingly smooth and burr free so that further finishing is not necessary.

The piston 26 is driven either manually or automatically in a manner not shown.

While both aspects of the invention have been employed by the assignee of the present invention to produce tube ends for the purpose of fabricating scaffolding and ladders used on an aircraft assembly line, it is clear that the invention has many other applications. In addition, the type of cut made, i.e., its configuration can be readily varied as noted above.

What is claimed is:

1. A method of forming a contour cut in a tube end, the tube end having an interior surface and an exterior surface, comprising the steps of:
   inserting a tube end within a contour cutting tool means;
   applying with said tool means, a force against a portion of the interior surface of the tube end while restraining a corresponding portion of the exterior surface of the tube end, causing said tube end in engagement with said tool means to be cut by shearing;
   rottating the tube end 180°.
   inserting the rotated tube end within the contour cutting tool means; and
   applying, with said tool means, a force against the remaining portion of the interior surface of the tube end while restraining a corresponding portion of the exterior surface of the tube end causing said tube end in engagement with said tool means to be cut by shearing.

2. A tool for forming a contour cut in a tube end, the tube end having an interior surface, comprising:
   a housing having a longitudinal bore intersected by a transverse bore; a punch reciprocally displaceable within the longitudinal bore, said punch having a contour cutting edge adapted to be received within a tube end inserted into the transverse bore and a slot at one end of which the contoured cutting edge is situated, said slot receiving a portion of the tube therein so that the cutting edge extends into the tube end; and
   means for displacing said punch within the longitudinal bore such that the cutting edge engages the interior surface of the tube end to form a cut surface.

3. The tool as defined in claim 1, wherein the cutting edge has an extent such that it engages the interior surface of the portion of the tube which extends into said slot at least at diametrically opposite points.

4. The tool as defined in claim 1, further comprising:
   a collar mounted to said housing at the transverse bore for holding a tube inserted in the transverse bore from having within the transverse bore.

5. The tool as defined in claim 4, wherein said punch includes alignment means, and said collar includes alignment means which are utilized in conjunction with the alignment means of said punch to locate a tube within said transverse bore.

* * * * *

UNITED STATES PATENT AND TRADEMARK OFFICE
CERTIFICATE OF CORRECTION

PATENT NO. : 4,986,154

DATED : January 22, 1991

INVENTOR(S) : Lorenzo VERNACCHIO

It is certified that error appears in the above-identified patent and that said Letters Patent is hereby corrected as shown below:

Claim 1, column 4, line 18, "rottating" should be "rotating".

Claim 4, column 4, line 50, "having" should be "moving".

Signed and Sealed this

Eleventh Day of August, 1992

*Attest:*

DOUGLAS B. COMER

*Attesting Officer*      *Acting Commissioner of Patents and Trademarks*